(12) United States Patent
Seto (10) Patent No.: US 10,965,827 B2
(45) Date of Patent: Mar. 30, 2021

(54) DOCUMENT READING DEVICE AND IMAGE FORMING APPARATUS

(71) Applicant: KYOCERA Document Solutions Inc., Osaka (JP)

(72) Inventor: Akifumi Seto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/838,626

(22) Filed: Apr. 2, 2020

(65) Prior Publication Data

US 2020/0322494 A1 Oct. 8, 2020

(30) Foreign Application Priority Data

Apr. 3, 2019 (JP) .............................. JP2019-071433

(51) Int. Cl.
*H04N 1/04* (2006.01)
*H04N 1/00* (2006.01)
*H04N 1/32* (2006.01)

(52) U.S. Cl.
CPC ..... *H04N 1/00628* (2013.01); *H04N 1/00644* (2013.01); *H04N 1/3263* (2013.01)

(58) Field of Classification Search
None
See application file for complete search history.

(56) References Cited

U.S. PATENT DOCUMENTS

| 2015/0156357 | A1* | 6/2015 | Yabe | H04N 1/047 358/498 |
| 2015/0373209 | A1* | 12/2015 | Aizono | H04N 1/0057 358/498 |
| 2017/0013140 | A1* | 1/2017 | Tachibana | H04N 1/00013 |
| 2017/0041471 | A1* | 2/2017 | Tachibana | H04N 1/00602 |
| 2018/0084118 | A1* | 3/2018 | Tachibana | H04N 1/3263 |
| 2020/0071103 | A1* | 3/2020 | Tachi | H04N 1/32667 |
| 2020/0213463 | A1* | 7/2020 | Seto | G06K 9/00456 |

FOREIGN PATENT DOCUMENTS

JP 2017052593 A 3/2017

* cited by examiner

*Primary Examiner* — Dung D Tran
(74) *Attorney, Agent, or Firm* — Studebaker & Brackett PC (57) ABSTRACT

A document reading device includes an image reading part, a document conveying part, an operation display part including a display device and receiving operation input, a double feed detecting part detecting double feed of a conveyed document, and a controlling part. In conveyance reading for documents, when double feed is detected from a double feed document, the controlling part stops the conveyance reading for a following document following to the double feed document. In re-reading for the double feed document, the controlling part displays, on the display device, urging to place the double feed document onto the document conveying part and sets a double feed detection function to OFF. After re-performing the conveyance reading for the double feed document, in restarting the following document, the controlling part sets the double feed detection function to ON and restarts the conveyance reading for the following document.

7 Claims, 9 Drawing Sheets

DOCUMENT READING DEVICE AND IMAGE FORMING APPARATUS

INCORPORATION BY REFERENCE

This application is based on and claims the benefit of priority from Japanese Patent application No. 2019-071433 filed on Apr. 3, 2019, the entire contents of which are incorporated herein by reference.

BACKGROUND

The present disclosure relates to a document reading device performing scanning operation, such as document conveying and image reading, and an image forming apparatus including this document reading device.

An image forming apparatus, such as a multifunction peripheral, includes a document reading device performing scanning operation, such as document conveying and image reading. The document reading device includes an image reading part, such as a scanner, obtaining image data by reading a document, and a document conveying part conveying the document one by one to the image reading part.

For example, a conventional sheet conveying device as the document conveying part interrupts conveying and reading of the document, when double feed of the document is detected by a double feed sensor. The conventional sheet conveying device displays a screen for a user to select disabling detection of double feed and restarting a job or maintaining enable of detection of double feeding and restarting a job, when the document in a conveying path is replaced on a document tray.

Conventionally, in the document reading device, when double feed of the document is caused, missed image data may be obtained by reading the document in an overlapped state. Thereupon, when overlap of the document is detected as double feed, scanning operation, such as document conveying and image reading, is stopped. In the document conveying part as mentioned above, when double feed of the document is detected, the document is not read, and a job with regard to the document to which double feed is detected is restarted, that is, the scanning operation is restarted. Moreover, the document conveying part enables setting whether or not detection of double feed of the document is performed while the scanning operation is restarted.

Incidentally, scanning operation of the document may be performed in a state that an attached article, such as a tag paper, a photograph or an attached paper, is stuck on the document, and then, the conventional document reading device detects the attached article stuck on the document as double feed. In order to avoid detection of double feed with regard to the attached article stuck on the document, it is necessary to disable detection of double feed or to remove the attached article from the document. When detection of double feed is disabled, the attached article stuck on the document is not detected as double feed, but if double feed of two or more documents is caused, because this double feed is also detected, loss of page is caused in a scanning operation result. Moreover, when the attached article is removed from the document, image data of the document in a state that the attached article is stuck cannot be obtained.

SUMMARY

A document reading device of the present disclosure includes an image reading part, a document conveying part, an operation display part, a double feed detecting part, and a controlling part. The image reading part reads a document to obtain image data of the document. The document conveying part conveys the document to the image reading part. The operation display part includes a display device and receives operation input from a user. The double feed detecting part detects double feed of the document conveyed to the image reading part. The controlling part, while performing conveyance reading including document conveying by the document conveying part and image reading by the image reading part with regard to a plurality of documents, when the double feed detecting part detects double feed of the document, stops the conveyance reading for a following document following to a double feed document to which double feed is detected. Moreover, the controlling part performs a re-reading operation for the double feed document to make the display device display an instruction for urging to place only one double feed document onto the document conveying part and to set a double feed detection function of the double feed detecting part to OFF. After re-performing the conveyance reading of the double feed document, the controlling part performs the restarting operation for the following document to set the double feed detection function to ON and to restart the conveyance reading of the following document.

An image forming apparatus of the present disclosure includes an image forming part forming an image, and the document reading devices as described above.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Figure 1:
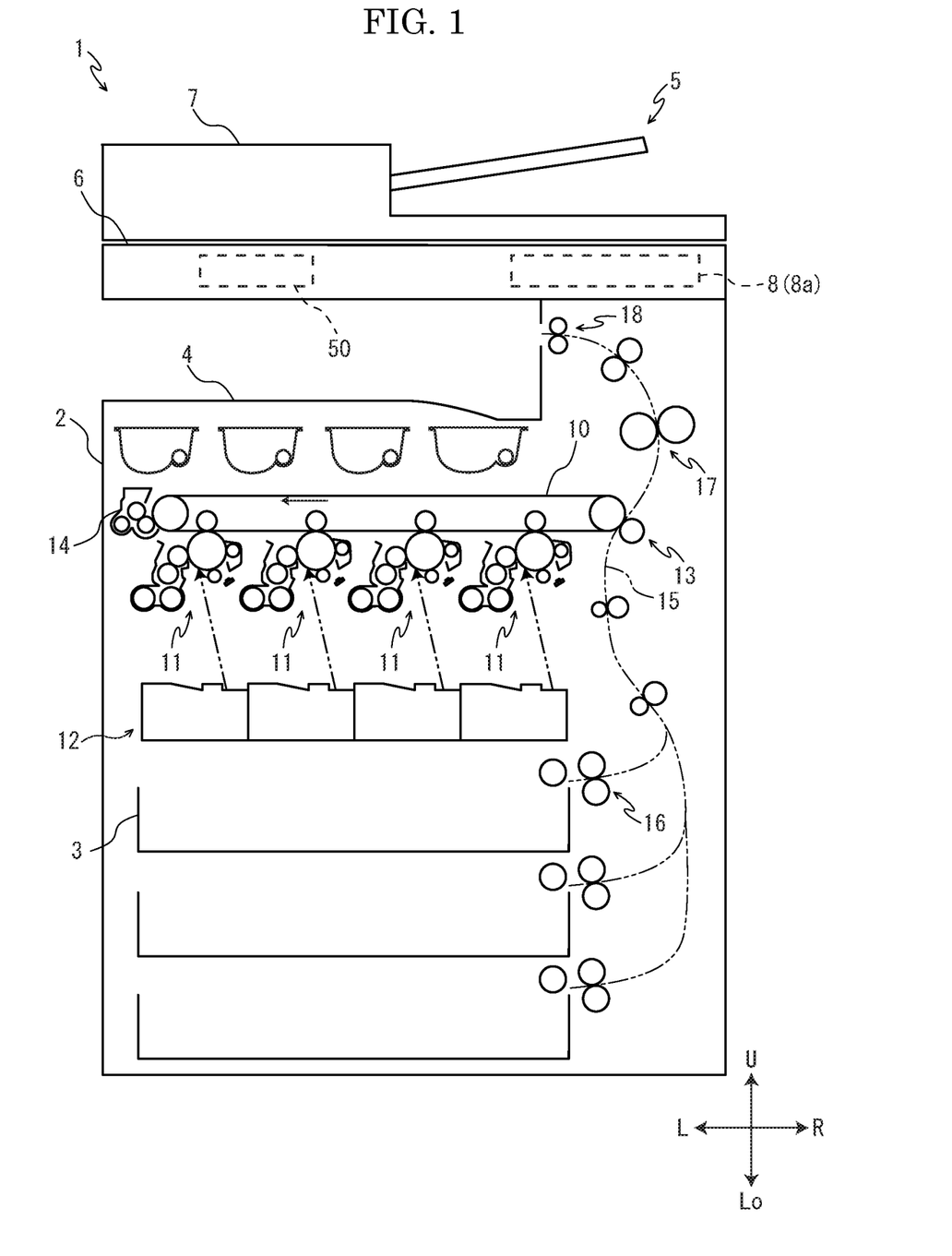
FIG. 1 is a sectional view schematically showing a multifunction peripheral according to an embodiment of the present disclosure.

First, entire structure of a multifunction peripheral 1 (an image forming apparatus) according to an embodiment of the present disclosure will be described with reference to FIG. 1. Hereinafter, for convenience of description, it will be described so that the front side of the multifunction peripheral 1 is positioned at the near side on a paper sheet of FIG. 1. Arrows L, R, U and Lo in each FIG respectively indicate a left side, a right side, an upper side and a lower side of the multifunction peripheral 1.

The multifunction peripheral 1 includes a roughly box-formed apparatus body 2. In a lower part of the apparatus body 2, a plurality of sheet feeding cartridges 3 storing sheets used for image forming are provided. In an in-body space of an upper part of the apparatus body 2, an ejected sheet tray 4 is provided.

Figure 2:
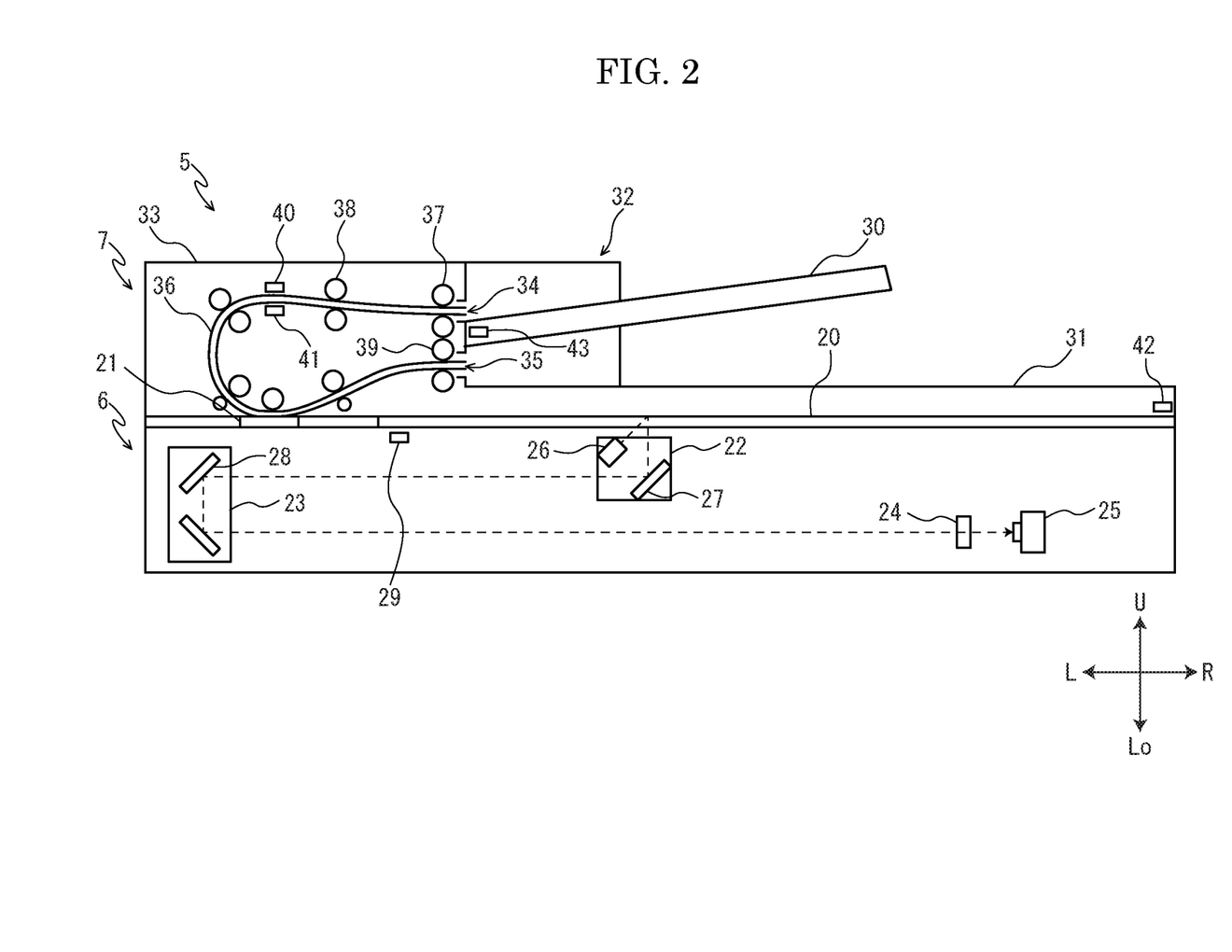
FIG. 2 is a sectional view schematically showing a document reading device of the multifunction peripheral according to the embodiment of the present disclosure.

In the upper part of the apparatus body 2, a document reading device 5 performing scanning operation, such as document conveying and image reading, is provided. The document reading device 5 includes, as shown in FIGS. 1 and 2, an image reading part 6 reading an image from a document and a document conveying part 7 conveying the document to the image reading part 6. In the image reading part 6 and the document conveying part 7, a conveying direction of the document is along left and right directions. Hereinafter, it will be described so that a longitudinal direction of the document is along the conveying direction and a width direction (forward and backward directions) of the document is along a direction orthogonal to the conveying direction. Details of the image reading part 6 and the document conveying part 7 are described later.

Further, in the upper part of the apparatus body 2, an operation display part 8 (an operation part) is attached at a front side. The operation display part 8 includes, for example, operation keys, such as ten keys, a start key, a system menu key, a transmission key and a copy key, and a display device 8a, such as a touch panel, to receive operation input from a user.

In a central part of the apparatus body 2, an intermediate transferring belt 10 as an image carrier is windingly stretched among a plurality of conveying rollers. At a lower side of the intermediate transferring belt 10, four image forming parts 11 forming the image are provided for respective toner colors (for example, four colors of yellow, magenta, cyan and black). At a lower side of the four image forming parts 11, an exposing part 12 is provided. At a right end of the intermediate transferring belt 10, a secondary transferring part 13 is provided and, at a left end of the intermediate transferring belt 10, a cleaning unit 14 for cleaning the intermediate transferring belt 10 is provided. The secondary transferring part 13 is composed of a part at a right end side of the intermediate transferring belt 10 and a secondary transferring roller.

In each image forming part 11, a photosensitive drum as an image carrier is rotatably provided. At the periphery of the photosensitive drum, a charging part, a developing part, a primary transferring part, a static eliminating part and a cleaning part are arranged in a sequential order of electrophotographic process. At an upper side of respective developing parts of the image forming parts 11, toner containers corresponding to the respective image forming parts 11 are provided for the respective toner colors (for example, four colors of yellow, magenta, cyan and black). Each toner container contains the toner of each color.

At a right part in the apparatus body 2, a conveying path 15 of the sheet used for image forming is provided. At an upstream part of the conveying path 15, a plurality of sheet feeding parts 16 are provided for the respective sheet feeding cartridges 3. At a middle stream part of the conveying path 15, the above-described secondary transferring part 13 is provided. At a downstream part of the conveying path 15, a fixing device 17 is provided and, at a downstream end of the conveying path 15, a sheet ejecting part 18 is provided.

Next, image forming operation of the multifunction peripheral 1 will be described. In the multifunction peripheral 1, image data is inputted from the image reading part 6 or an external computer. In each image forming part 11, the photosensitive drum is electrically charged by the charging part, and then, exposed on the basis of the image data by the exposing part 12, and thereby, an electrostatic latent image is formed on the photosensitive drum. The electrostatic latent image on the photosensitive drum is developed for a toner image of each color by the developing part. The toner image on the photosensitive drum is primarily transferred to a surface of the intermediate transferring belt 10 by the primary transferring part. The four image forming parts 11 sequentially perform the above-described operation, and thereby, a toner image of full color (a color toner image) is formed on the intermediate transferring belt 10. The color toner image is supplied to a secondary transferring part 13 at a predetermined secondary transfer timing by rotation of the intermediate transferring belt 10.

On the other hand, a sheet stored in the sheet feeding cartridge 3 is picked up by the sheet feeding part 16, and then, conveyed on the conveying path 15. Subsequently, the sheet on the conveying path 15 is conveyed to the secondary transferring part 13 at the predetermined secondary transfer timing described above. In the secondary transferring part 13, the color toner image on the intermediate transferring belt 10 is secondarily transferred to the sheet. The sheet having the secondarily transferred color toner image is conveyed to a downstream side on the conveying path 15 and, after the color toner image is fixed to the sheet by the fixing part 17, the sheet is ejected from the sheet ejecting part 18 to the ejected sheet tray 4.

Next, the image reading part 6 will be described. The image reading part 6 is arranged at an upper side in the in-body space of the apparatus body 2 and includes, as shown in FIG. 2, a platen glass 20 being a document table and a reading slit glass 21 on an upper face of the apparatus body 2. The reading slit glass 21 is arranged at a left side and the platen glass 20 is arranged at a right side from the reading slit glass 21. Moreover, the image reading part 6 includes an optical scanning unit 22, a reflecting unit 23, a light collecting lens 24 and an image picking-up part 25, such as a charge-coupled device (CCD).

The optical scanning unit 22 has a light source 26 irradiating a light toward the document on the platen glass 20 or the reading slit glass 21 and a reflection mirror 27 directing the light reflected by the document toward the reflecting unit 23. The reflecting unit 23 has a plurality of reflection mirrors 28. The optical scanning unit 22 is formed in a long shape elongated in a main scanning direction (forward and backward directions) and is configured so as to move in a sub scanning direction (left and right directions). The reflecting unit 23 is configured so as to move in accordance with movement of the optical scanning unit 22 so that an optical path length from the document to the light collecting lens 24 is kept always constant. The light collecting lens 24 and the image picking-up part 25 are fixedly attached at a right side.

In the image reading part 6, in case of performing placement reading for reading the image from the document placed on the platen glass 20, the optical scanning unit 22 reads the image from the document while shifting a reading position by moving from the left side to the right side (in the sub scanning direction). At this time, the optical scanning unit 22 irradiates the light toward the document on the platen grass 20 by the light source 26 and makes the reflected light from the document incident to the image picking-up part 25 via the reflecting unit 23 and the light collecting lens 24. The image picking-up part 25 picks up the image of the document by performing photoelectric conversion on the basis of the reflected light from the document. Subsequently, the image reading part 6 scans the document placed on the platen glass 20 from a leading end to a trailing end to create image data. the image reading part 6 includes a placed document sensor 29 detecting the document placed on the platen glass 20 and may enable placement reading in a case of detecting the document by the placed document sensor 29.

Moreover, in the image reading part 6, in case of performing conveyance reading for reading the image from the document conveyed from the document conveying part 7, the optical scanning unit 22 reads the image from the document at a reading position fixedly determined to a position corresponding to the reading slit glass 21. At this time, the optical scanning unit 22 irradiates the light toward the document on the reading slit glass 21 by the light source 26 and makes the reflected light from the document incident to the image picking-up part 25 via the reflecting unit 23 and the light collecting lens 24. The image picking-up part 25 picks up the image of the document by performing photoelectric conversion on the basis of the reflected light from the document. Subsequently, the image reading part 6 scans the document passing on the reading slit glass 21 from a leading end to a trailing end to create image data.

Incidentally, in document conveying by the document conveying part 7, when a double feed detecting part 41 described later detects double feed of the document, the image reading part 6 may read the document to which double feed is caused (double feed document) to create the image data. The image data obtained when double feed is detected is deleted when new image data is created in re-reading operation for the double feed document by a re-reading controlling part 52 described later.

The image reading part 6 transmits the image data created for each document to a controlling part 50 (refer to FIG. 3) of the multifunction peripheral 1 to store the image data in a storing part 51. As a setting condition of image reading of the multifunction peripheral 1 or the image reading part 6, monochrome image reading or color image reading is set, and then, the image reading part 6 may reads, in either case, a color image from the document to obtain the image data composed of color data (RGB data). Subsequently, the controlling part 50 performs image processing, such as binarization processing, with regard to the image data being the color image as necessary to create the image data being a monochrome image, and then, to store the image data in the storing part 51.

Next, the document conveying part 7 will be described. The document conveying part 7 is arranged above the image reading part 6, has a document conveying function and is openably/closably attached as a cover member covering the platen glass 20 (or an upper face of the apparatus body 2) of the image reading part 6. The document conveying part 7 includes an opening/closing sensor 42 detecting opening and closing with regard to the platen glass 20 and may enable placement reading in a case of detecting closing of the document conveying part 7 by the opening/closing sensor 42.

The document conveying part 7 includes, as shown in FIG. 2, a supply tray 30 on which the document before image reading is placed, an ejection tray 31 on which the document after image reading is ejected, and a conveying mechanism 32 feeding the document on the supply tray 30 to the ejection tray 31 via the reading position corresponding to the reading slit glass 21. The conveying mechanism 32 is arranged at the left side so as to correspond the reading slit glass 21, the supply tray 30 is extended from an upper part of the conveying mechanism 32 to the right side, and the ejection tray 31 is extended from a lower part of the conveying mechanism 32 to the right side.

The supply tray 30 is formed to incline slightly downward from a right end of the supply tray 30 toward the conveying mechanism 32. An upper face of the supply tray 30 is a placement face on which a plurality of documents can be placed and, on the placement face, a pair of guides restricting a position of the document in the width direction are provided so as to be slidable in the width direction. The document conveying part 7 includes a conveyed document sensor 43 detecting the document placed on the supply tray 30 and may enable placement reading in a case of detecting the document by the conveyed document sensor 43.

The ejection tray 31 is formed by a part of a base part of the document conveying part 7 covering the upper face of the apparatus body 2, and the base part of the document conveying part 7 is formed with the same outer diameter as the apparatus body 2 in a plan view.

The conveying mechanism 32 is surrounded by a cover 33, and, in an upper part of a right face of the cover 33, a supply port 34 opened at a position corresponding to the supply tray 30 is formed and, in a lower part of the right face of the cover 33, an ejection port 35 opened at a position corresponding to the ejection tray 31 is formed. The conveying mechanism 32 has a conveying path 36 inside the cover 33, and the conveying path 36 is arranged so as to be extended from the supply port 34 to the left side, to be curved downward at the left side, to be further bent to the right side, to pass through the reading position corresponding to the reading slit glass 31, and to be extended to the ejection port 35. The conveying mechanism 32 includes a supplying roller 37, a plurality of conveying rollers 38, an ejecting roller 39, a document detecting part 40 and the double feed detecting part 41 along the conveying path 36.

The supplying roller 37 is provided so as to be rotatable in the vicinity of the supply port 34 and supplies the documents on the supply tray 30 one by one to the conveying path 36 by rotating. The ejecting roller 39 is provided so as to be rotatable in the vicinity of the ejection port 35 and ejects the document from the conveying path 36 to the ejection tray 31 by rotating. The plurality of conveying rollers 38 are rotatably arranged at intervals between the supplying roller 37 and the ejecting roller 39 on the conveying path 36. The supplying roller 37, the plurality of conveying rollers 38 and the ejecting roller are driven and rotated by rotation driving force transmitted from a driving part (not shown) controlled by the controlling part 50 (refer to FIG. 3).

The document detecting part 40 detects the document conveyed on the conveying path 36 and is composed of an optical sensor including a light emitting part and a light receiving part. The document detecting part 40 outputs a detection signal indicating a result detected by the document detecting part 40, for example, outputs the detection signal of ON in a case of detecting the document or the detection signal of OFF in a case of not detecting the document. The document detecting part 40 is arranged at any position along the conveying path 36, for example, a plurality of document detecting parts 40 may be respectively arranged at different conveying positions on the conveying path 36 so as to detect the document at the respective conveying positions.

The document detecting part 40 starts to detect the document after the document conveying part 7 starts to convey the document, and then, detects the document from the leading end to the trailing end. For example, the document detecting part 40 is arranged at an upstream side from the reading position corresponding to the reading slit glass 21 in the conveying direction of the conveying path and obtains an entry timing of the document to the reading position, i.e. a reading start timing, by detecting the leading end of the document entering the reading position. Moreover, the document detecting part 40 is arranged at a downstream side from the reading position corresponding to the reading slit glass 21 in the conveying direction of the conveying path 36 and obtains an exit timing of the document from the reading position, i.e., a reading end timing, by detecting the trailing end of the document exiting from the reading position.

The double feed detecting part 41 is arranged at a predetermined position between the supplying roller 37 and the reading position corresponding to the reading slit glass 21 on the conveying path 36. The double feed detecting part 41 detects overlap of the document conveyed on the conveying path 36 as double feed, for example, is composed of an ultrasonic sensor or the like. The double feed detecting part 41 detects overlap of a few documents or overlap of the document and an attached article (e.g. a tag paper, a photograph or an attached paper) stuck on the document and outputs a detection signal indicating a result detected by the double feed detecting part 41. For example, the double feed detecting part 41 outputs the detection signal of ON in a case of detecting double feed of the document or the detection signal of OFF in a case of not detecting double feed of the document.

The double feed detecting part 41 is controlled by the controlling part 50 to enable switching of ON and OFF of a double feed detection function. Incidentally, the double feed detecting part 41 may be composed of a plurality of double feed sensors 41a (refer to FIG. 12), such as ultrasonic sensors, arranged at intervals in the width direction so as to detect double feed of the document over the width direction. The plurality of double feed sensors 41a output detection signals indicating results detected by the double feed sensors 41a, respectively. The double feed detecting part 41 is arranged so as to detect double feed of the document at a predetermined detecting position in the conveying direction, for example, is provided so that the detecting position is equal to a detecting position of the document detecting part 40 at the upstream side from the reading position. And then, the double feed detecting part 41 detects double feed of the document after the document conveying part 7 starts to convey the document and until the document detecting part 40 detects the trailing end of the document after detecting the leading end of the document.

Figure 3:
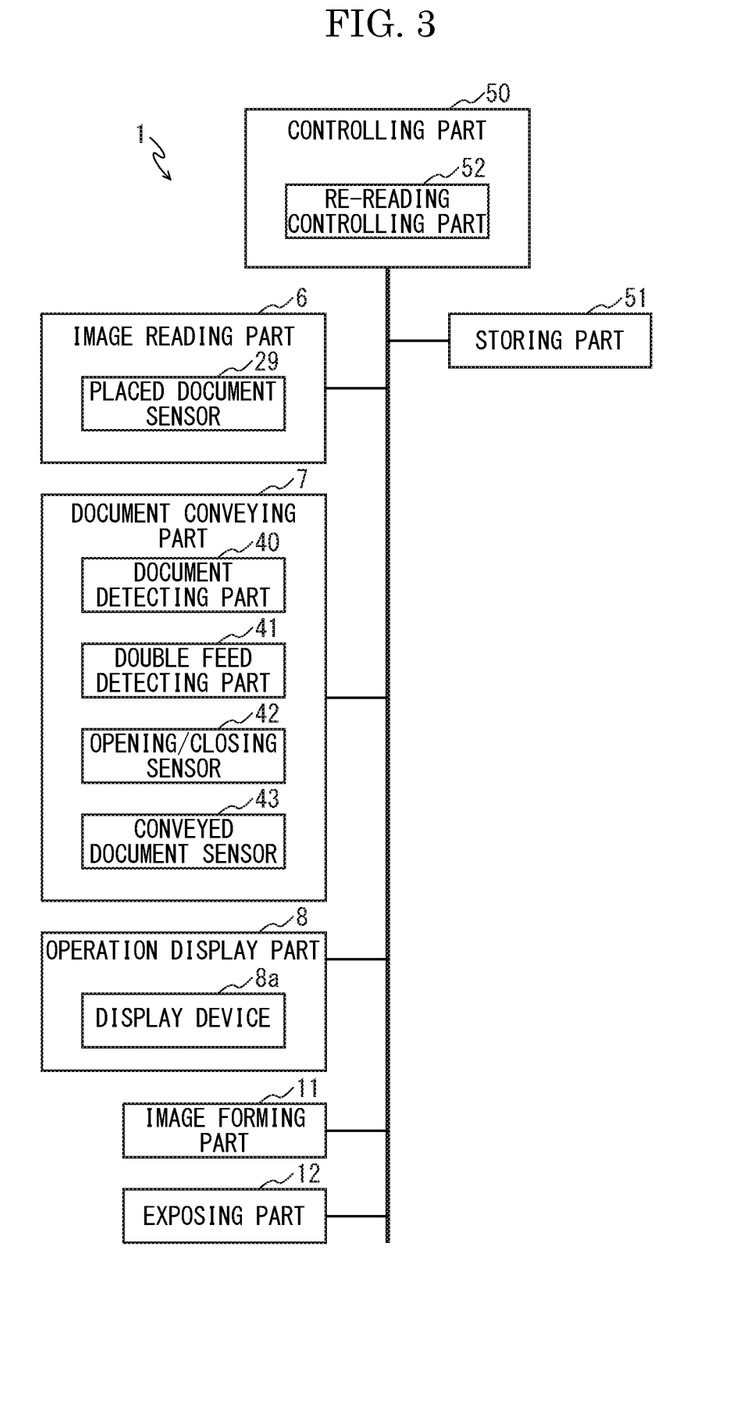
FIG. 3 is a block diagram showing electric structure of the multifunction peripheral according to the embodiment of the present disclosure.

Next, electric structure of the above-described multifunction peripheral 1 will be described with reference to FIG. 3. The multifunction peripheral 1 includes the controlling part 50 composed of a central processing unit (CPU) or the like, and the storing part 51 composed of a ROM, a RAM and others, inside the apparatus body 2.

The controlling part 50 controls each component connected to the controlling part 50 on the basis of control program and control data stored in the storing part 51. The controlling part 50 is connected to each part of the multifunction peripheral 1, such as the image reading part 6, the document conveying part 7, the operation display part 8, the image forming parts 11 and the exposing part 12, and controls the scanning operation, such as document conveying by the document conveying part 7, double feed detection by the double feed detecting part 41 and image reading by the image reading part 6. Moreover, the controlling part 50 works as the re-reading controlling part 52 by executing the program stored in the storing part 51. The re-reading operation for performing conveyance reading of the double feed document again by the re-reading controlling part 52 is included in the scanning operation.

Figure 4:
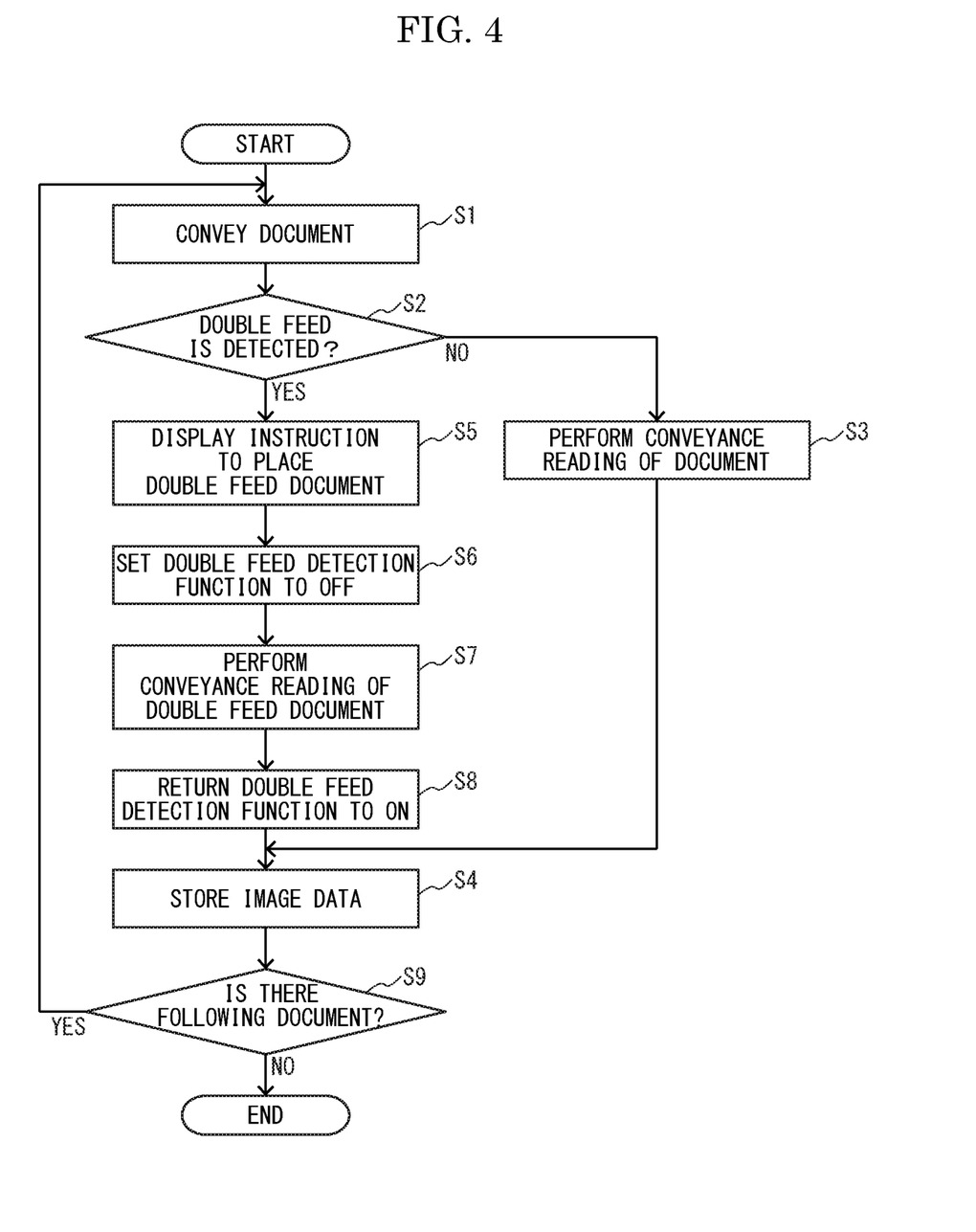
FIG. 4 is a flow chart showing scanning operation in the multifunction peripheral according the embodiment of the present disclosure.

FIG. 4 shows a flow chart indicating the scanning operation. In the scanning operation of one job, with regard to one or more documents (a plurality of documents) placed on the supply tray 30 of the document conveying part 7, conveyance reading including document conveying by the document conveying part 7 (step S1 in FIG. 4), double feed detection by the double feed detecting part (step S2 in FIG. 4) and image reading by the image reading part 6 (step S3 in FIG. 4) are automatically performed. When the scanning operation is started, the double feed detection function of the double feed detecting part 41 is automatically set to ON.

Incidentally, since the image data created by the image reading part 6 is sequentially stored in the storing part 51 (step S4 in FIG. 4), for example, is stored in conveyance order of the document, the image data can be obtained from the storing part 51 on the basis of the conveyance order. The controlling part 50 can grasp the conveyance order by monitoring drive of the supplying roller 37 or the ejecting roller 39 conveying the document or a detecting result of the document by the document detecting part 40.

Incidentally, in the scanning operation for the plurality of documents, with regard to the double feed document to which double feed is detected by the double feed detecting part 41 (step S2: YES in FIG. 4), the re-reading operation is performed by the re-reading controlling part 52 (steps S5-S8 in FIG. 4). Therefore, regardless of double feed, the image data of the plurality of documents is stored in the storing part 51 without varying the conveyance order (step S4 in FIG. 4).

When conveyance reading of all the documents is completed, one image data file is created so as to collectively include respective image data of the documents. For example, in a case where the image data for one page is created from one document, the image data file including the number of pages corresponding to the number of the documents is created.

Next, the re-reading controlling part 52 will be described. The re-reading controlling part 52 grasps double feed of the document on the basis of the detection signal outputted by the double feed detecting part 41 and grasps passage of the document at the detecting position of the double feed detecting part 41 on the basis of the detection signal outputted by the document detecting part 40 at the upstream side from the reading position.

For example, the re-reading controlling part 52 measures an elapsed time after the leading end of the document is passed through the detecting position and calculates a distance from the leading end of the document to the detecting position in the conveying direction (a longitudinal direction) on the basis of the elapsed time, i.e., calculates a position on the document in the longitudinal direction corresponding to the detecting position. Thereby, the re-reading controlling part 52 grasp a position of double feed on the document in the longitudinal direction. Moreover, the re-reading controlling part 52 grasps a position of double feed on the document in the width direction in accordance with which double feed sensor 41a of the plurality of double feed sensors 41a arranged side by side in the width direction in the double feed detecting part 41 detects double feed. Incidentally, if double feed is continuously detected in the longitudinal direction or the width direction from the leading end to the trailing end of the document, the re-reading controlling part 52 may decide continuing double feeds as one double feed.

In a case where the double feed detecting part 41 detects double feed of the document (step S2: YES in FIG. 4) while conveyance reading of the plurality of documents placed on the supply tray 30 of the document conveying part 7 is performed, the re-reading controlling part 52 stops conveyance reading of the document following to the double feed document (following document) after the double feed document is ejected to the ejection tray 31. Incidentally, if double feed of the document is detected, the image reading part 6 may read the image from the double feed document to create the image data as described above and store the image data in the storing part 51 without applying the image data to a scanning operation result.

Figure 7:
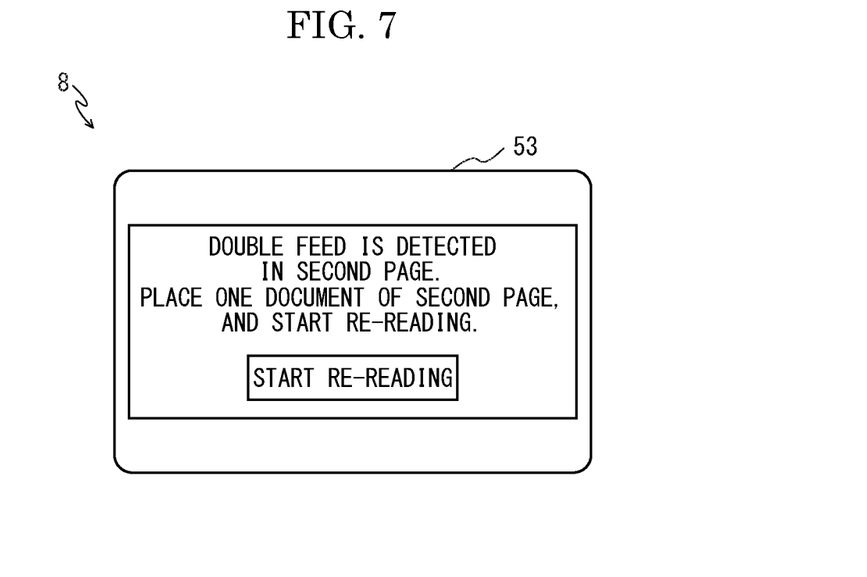
FIG. 7 is a plane view showing an example of an instructing screen for placing double feed documents when re-reading in the multifunction peripheral according the embodiment of the present disclosure.

Subsequently, the re-reading controlling part 52 performs the re-reading operation for one double feed document before restarting conveyance reading for the following document. The re-reading controlling part 52 firstly performs a placement instruction for the double feed document on the supply tray 30 (step S5 in FIG. 4) and switches the double feed detection function of the double feed detecting part 41 to OFF (step S6 in FIG. 4). At this time, because the following document is supposed to be still placed on the supply tray 30, the re-reading controlling part 52 makes the display device 8a of the operation display part 8 display an instructing screen 53 including an instruction for urging (instructing) to place only one double feed document onto the supply tray 30, as shown in FIG. 7. Incidentally, on the instructing screen 53, an instruction to remove the following document from the supply tray 30 may be displayed.

When the conveyed document sensor 43 detects that the double feed document is placed on the supply tray 30, the document reading device 5 becomes capable of performing the re-reading operation for one double feed document. Here, when the start key of the operation display part 8 is operated, in a state that the double feed detection function of the double feed detecting part 41 is kept OFF, the document conveying part 7 conveys only one double feed document placed on the supply tray 30 to the image reading part 6, and the image reading part 6 reads the image from the double feed document conveyed from the supply tray 30 to obtain the image data of the double feed document (step S7 in FIG. 4). Moreover, the re-reading controlling part 52 returns the double feed detection function of the double feed detecting part 41 to ON (step S8 in FIG. 4). Subsequently, when the re-reading operation for the double feed document is completed, the re-reading controlling part 52 stores the image data obtained from the double feed document in the storing part 51 with applying the image data to a scanning operation result (step S4 in FIG. 4). Incidentally, the image data of the double feed document obtained in the re-reading operation is stored as the image data of a page following to a previous page of the double feed document, and the re-reading controlling part 52 deletes the image data of the double feed document obtained when double feed is detected from the storing part 51.

Figure 9:
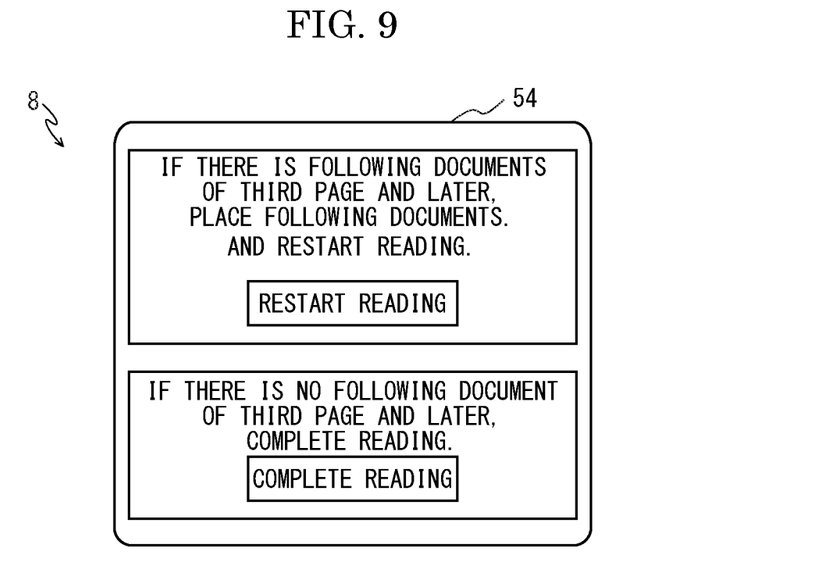
FIG. 9 is a plane view showing an example of an instructing screen for placing following documents when restarting conveying and reading in the multifunction peripheral according the embodiment of the present disclosure.

When the re-reading operation for the double feed document is thus completed, if there is not any following document (step S9: NO in FIG. 4), the scanning operation is completed. On the other hand, if there is the following document (step S9: YES in FIG. 4), the above-described flows (steps S1-S8) are repeated. In order to perform a restarting operation for restarting conveyance reading for the following document, as shown in FIG. 9, the re-reading controlling part 52 makes the display device 8a of the operation display part 8 display an instructing screen 54 on which an instruction to replace the following document on the supply tray 30 is displayed. At this time, on the instructing screen 54, the number of the following documents is displayed on the basis of the conveyance order of the following documents. Subsequently, when the conveyed document sensor 43 detects that the following documents are placed on the supply tray 30, the document reading device 5 becomes capable of performing the restarting operation for the following documents. Here, when the start key of the operation display part 8 is operated, in a state that the double feed detection function of the double feed detecting part 41 is kept ON, as the restarting operation for the following documents, conveyance reading for the following documents is restarted.

Figure 5:
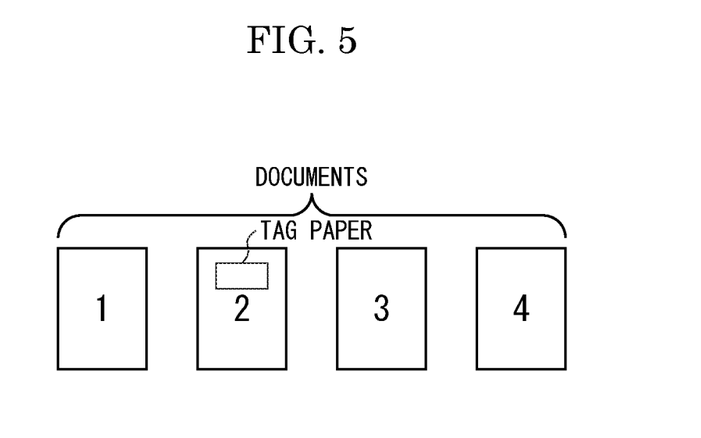
FIG. 5 is an explanatory drawing showing an example of documents used in the scanning operation in the multifunction peripheral according the embodiment of the present disclosure.

In the document reading device 5, an example performing the scanning operation for four documents as shown in FIG. 5 will be described as follows. In this example, a tag paper is stuck on the document of second page.

Figure 6:
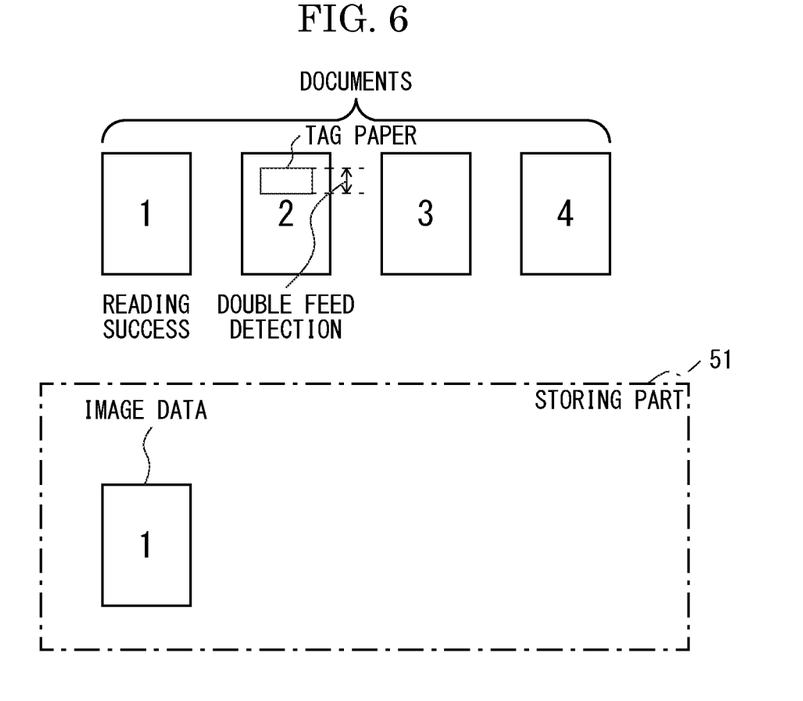
FIG. 6 is an explanatory drawing showing an example of the documents used in the scanning operation and image data obtained from the documents in the multifunction peripheral according the embodiment of the present disclosure.

First, in the document reading device 5, the four documents are placed on the supply tray 30 and conveyance reading is started. As shown in FIG. 6, with regard to the document of a first page, because double feed is not caused, conveying and image reading succeeds, and the image reading part 6 stores the image data corresponding to the document of the first page in the storing part 51 with applying the image data to the scanning operation result.

With regard to the document of a second page, because the tag paper is stuck, double feed is detected by the double feed detecting part 41, and the image reading part 6 stores the image data corresponding to the document of the second page to which double feed is detected in the storing part 51 without applying the image data to the scanning operation result. At this time, after the double feed document of the second page is ejected to the ejection tray 31, the re-reading controlling part 52 stops conveyance reading of the documents of a following third page and later (following documents). Subsequently, the re-reading controlling part 52 makes the display device 8a of the operation display part 8 display the instructing screen 53 including the instruction for urging (instructing) to place only one double feed document onto the supply tray 30, as shown in FIG. 7, and switches the double feed detection function of the double feed detecting part 41 to OFF.

Figure 8:
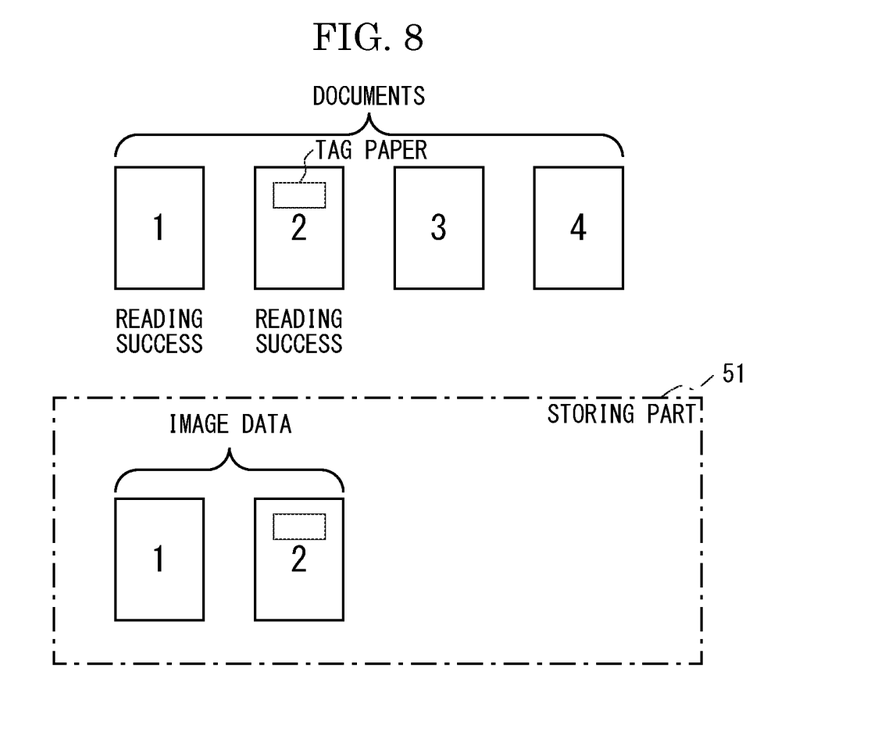
FIG. 8 is an explanatory drawing showing an example of the documents used in the scanning operation and image data obtained from the documents in the multifunction peripheral according the embodiment of the present disclosure.

When one double feed document is placed on the supply tray 30 again and the start key of the operation display part 8 is operated, the re-reading operation for the double feed document is performed. In the re-reading operation for the double feed document, in a state that the double feed detection function is kept OFF, the document conveying part 7 conveys one double feed document from the supply tray 30 to the image reading part 6, and the image reading part 6 reads the image from the double feed document to obtain the image data of the double feed document. After that, the re-reading controlling part 52 returns the double feed detection function to ON. Thereby, as shown in FIG. 8, image reading of the double feed document succeeds, and the re-reading controlling part 52 or the image reading part 6 stores the image data corresponding to the document of the second page in the storing part 51 with applying the image data to the scanning operation result.

Figure 10:
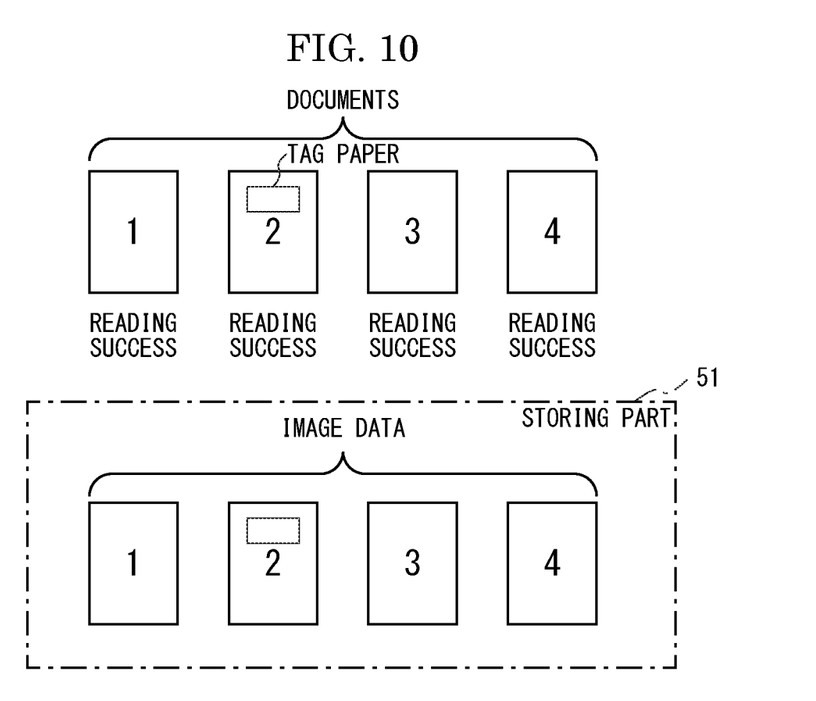
FIG. 10 is an explanatory drawing showing an example of the documents used in the scanning operation and image data obtained from the documents in the multifunction peripheral according the embodiment of the present disclosure.

Next, the re-reading controlling part 52 makes the display device 8a of the operation display part 8 display the instructing screen 54 of a placement instruction for the following documents of the third page and later following to the double feed document onto the supply tray 30, as shown in FIG. 9. When the following documents is placed on the supply tray 30 and the start key of the operation display part 8 is operated, the restarting operation for the following documents is performed. In the restarting operation for the following documents, the document conveying part 7 sequentially conveys the following documents of the third page and later from the supply tray 30 to the image reading part 6, and the image reading part 6 sequentially reads the images from the following documents to obtain the image data of the following documents. Because any attached article is not stuck on the following documents of the third page and later, if double feed is not caused, as shown in FIG. 10, image reading succeeds, and the image reading part 6 stores the image data corresponding to the following documents of the third page and later in the storing part 51 with applying the image data to the scanning operation result.

Incidentally, there is no following document of the third page and later following to the double feed document, on the instructing screen 54 as shown in FIG. 9, by operating a reading completing key, as described above, conveyance reading of all the documents is completed, and one image data file is created so as to collectively include respective image data of the documents.

In accordance with the first embodiment, as described above, the document reading device 5 includes the image reading part 6, the document conveying part 7, the operation display part 8, the double feed detecting part 41, and the controlling part 50. The image reading part 6 reads the document to obtain the image data of the document. The document conveying part 7 conveys the document to the image reading part 6. The operation display part 8 includes the display device 8a and receives operation input from the user. The double feed detecting part 41 detects double feed of the document conveyed to the image reading part 6. The controlling part 50, while performing conveyance reading including document conveying by the document conveying part 7 and image reading by the image reading part 6 with regard to the plurality of documents, when the double feed detecting part 41 detects double feed of the document, stops conveyance reading for the following document following to the double feed document to which double feed is detected.

The controlling part 50 performs the re-reading operation for the double feed document to make the display device 8a display the instruction for urging to place only one double feed document onto the document conveying part 7 and to set the double feed detection function of the double feed detecting part 41 to OFF and after re-performing conveyance reading of the double feed document, performs the restarting operation for the following document to set the double feed detection function to ON and to restart conveyance reading of the following document.

For example, when conveyance reading for the plurality of documents is performed, if the document to which the attached article, such as the tag paper, the photograph or the attached paper, is stuck is conveyed, double feed of the document is detected. In such a case, if the documents were individually conveyed in second conveyance reading, double feed is detected again. Thereupon, in the present embodiment, in the re-reading operation for the double feed document, by setting the double feed detection function of the double feed detecting part 41 to OFF and re-performing conveyance reading of the double feed document, it is unnecessary to remove the attached article from the document to which the attached article is stuck, and it is possible to succeed in image reading for the document to which the attached article is stuck without detecting double feed. Thereby, it is possible to obtain the image data of the document to which the attached article is stuck. Moreover, since it is unnecessary to retry conveyance of the document to which the attached article is stuck many times, it is possible to restrain damage of the document due to conveyance.

Further, in conveyance reading for the following document following to the double feed document, since the double feed detection function of the double feed detecting part 41 is switched to ON, it is possible to detect double feed caused in the following document and to restrain loss of page in the scanning operation result. Incidentally, in the scanning operation result of the plurality of documents, it is possible to record the image data obtained in normal conveyance reading and the image data obtained in conveyance reading of the re-reading operation into the common image data file. Thus, it is possible to appropriately perform image reading for the document to which double feed is detected in the scanning operation result of the plurality of documents.

Detection of double feed by the double feed detecting part 41 is caused in a case where the attached article is stuck on the double feed document or a case where the following document is overlapped to the double feed document. In the re-reading operation for the double feed document, the user may desire the image data of double feed document to which the attached article is stuck or the image data of double feed document from which the attached article is removed. For example, when conveyance reading for the plurality of documents is performed, if two or more documents are conveyed in a stuck state by static electricity or moisture, double feed of the documents is detected. However, by conveying one document in the re-reading operation, it is possible to succeed in image reading for the document without detecting double feed.

Although, in the above-described embodiment, an example that the re-reading controlling part 52 returns the double feed detection function of the double feed detecting part 41 to ON in the restarting operation for the following document after the re-reading operation for the double feed document is described, the present disclosure is not limited by this example. For example, in another embodiment of the disclosure, in the scanning operation result of the plurality of documents, in a case where the double feed detecting part 41 detects double feed of the following document following the double feed document or a case where the double feed detecting part 41 detects double feed of the documents by predetermined times in one scanning operation, the re-reading controlling part 52 may receive, via the operation display part 8, user selection whether or not the double feed detection function of the double feed detecting part 41 is kept always OFF in the restarting operation for the following documents thereafter. In other words, in a case where the double feed detecting part 41 detects double feed of the documents continuously or a case where the double feed detecting part 41 detects double feed of the documents by predetermined times in one scanning operation, the re-reading controlling part 52 receives the user selection whether or not the double feed detection function of the double feed detecting part 41 is kept always OFF in the restarting operation thereafter.

Figure 11:
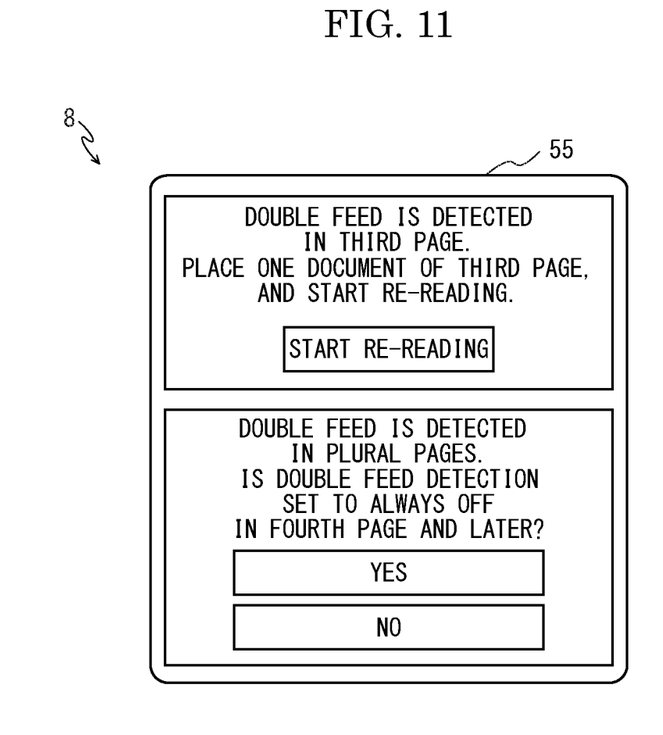
FIG. 11 is a plane view showing an example of an inquiring screen for a double feed detection function when re-reading the double feed document and when restarting the following documents in the multifunction peripheral according another embodiment of the present disclosure.

For example, the re-reading controlling part 52 makes the operation display part 8 display an inquiring screen 55 for urging (instructing) to place only one double feed document onto the supply tray 30 similarly to the instructing screen 53 and inquiring the user selection that the double feed detection function is kept always OFF in the restarting operation for the following documents, as shown in FIG. 11. On the inquiring screen 55, an input key capable of inputting the user selection and others are displayed. When always OFF of the double feed detection function of the following documents is selected on the inquiring screen 55, the re-reading controlling part 52 set the double feed detection function of the double feed detecting part 41 to always OFF after the re-reading operation for the double document and then, performs the restarting operation for the following documents. Incidentally, when the scanning operation being performed for the plurality of documents is completed, the re-reading controlling part 52 returns the double feed detection function of the double feed detecting part 41 to ON.

Thereby, for example, in a case where there are many documents to which the attached articles, such as the tag paper, are stuck, by selecting always OFF of the double feed detection function of the double feed detecting part 41, it is possible to restrain stop due to detection of double feed of the attached article and to reduce labor for replacement of the double feed document and the following documents onto the supply tray 30, and accordingly, to smoothly perform the scanning operation.

Figure 12:
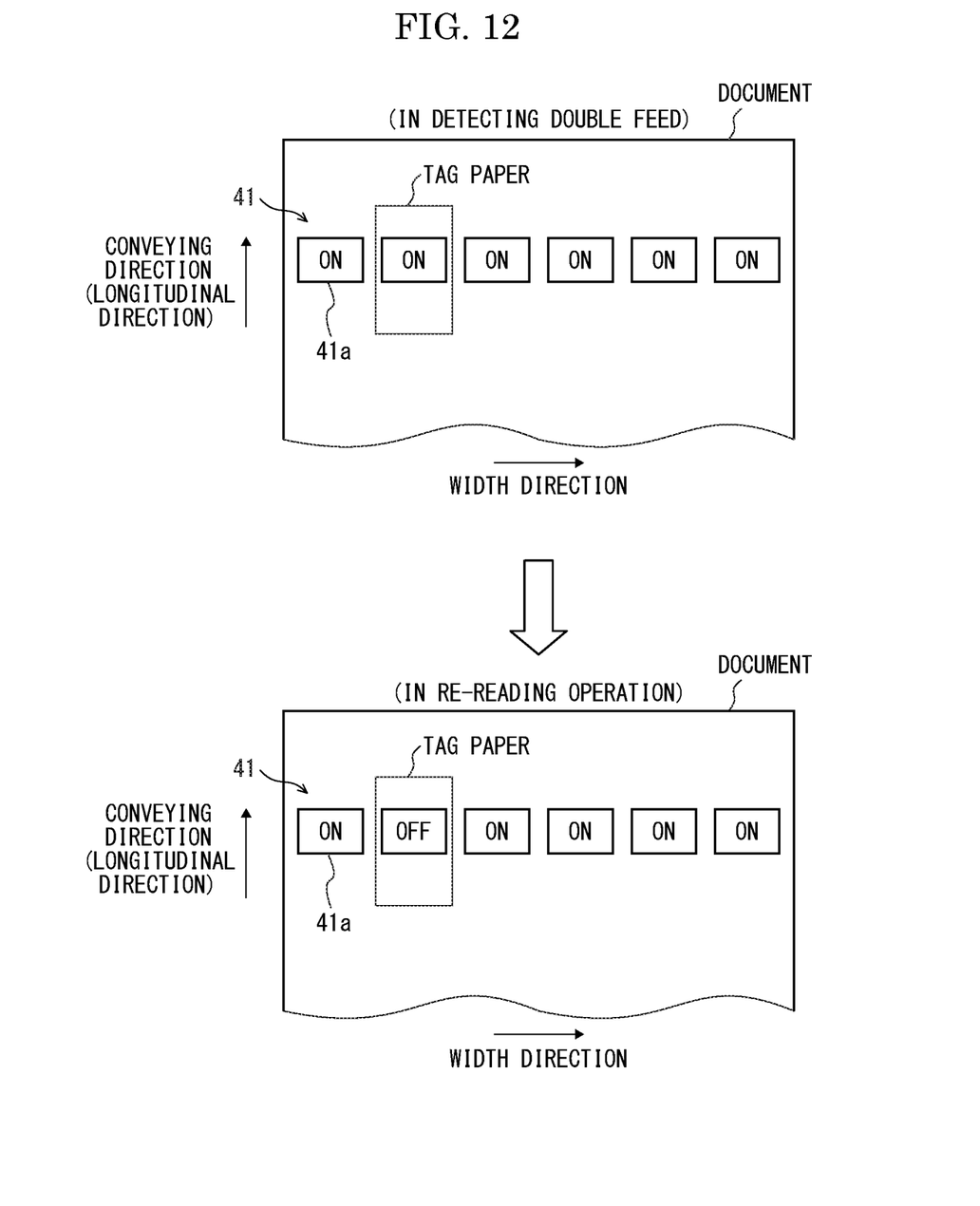
FIG. 12 is an explanatory drawing showing an example of operation of double feed sensors in a double deed detecting part in the multifunction peripheral according a further embodiment of the present disclosure.

Incidentally, in a case where the double feed detecting part 41 detects double feed of the document and Off of the double feed detection function is selected on the inquiring screen 55 of the operation display part 8, the re-reading controlling part 52 may set all the plurality of double feed sensors 41a of the double feed detecting part 41 to OFF, or may set only a part of the double feed sensors 41a, e.g. only the double feed sensor 41a in which double feed is detected, in a further embodiment as shown in FIG. 12. In other words, when one double feed sensor 41a of the plurality of double feed sensors 41a detects double feed of the document, in the re-reading operation, the re-reading controlling part 52 sets the double feed detection function of one double feed sensor 41a that detects double feed of the documents to OFF and sets the double feed detection function of other double feed sensors 41a of the plurality of double feed sensors 41a to ON. The re-reading controlling part 52 receives respective detection signals from the plurality of double feed sensors 41a, and thereby, can grasp which of the double feed sensors 41a detects double feed.

Thereby, for example, in a case where a part of the double feed sensors 41a detests the attached article stuck on a part of the document in the width direction as double feed, in the re-reading operation for the double feed document, since this part of the double feed sensors 41a is set to OFF, the attached article stuck on the double feed document shall not be detected as double feed. Moreover, in a case where the double feed document is overlapped to the other document and conveyed in the re-reading operation, the other double feed sensors 41a kept ON can detect overlap of the double feed document and the other document as double feed. Therefore, even if the double feed document and the following document are overlapped and placed on the supply tray 30, it is possible to detect double feed.

Incidentally, although, in the above-described embodiment, an example that the controlling part 50 provided in the multifunction peripheral 1 controls the scanning operation of the document reading device 5 is described, the present disclosure is not limited by this example. For example, in a different embodiment of the disclosure, the other controlling device provided in the document reading device 5 may control the scanning operation.

Moreover, although, in the above-described embodiment, an example that the operation display part 8 provided in the multifunction peripheral 1 displays the instructing screen 53, the instructing screen 54 and the inquiring screen 55 is described, the present disclosure is not limited by this example. For example, in a different embodiment of the disclosure, the other display device provided in the document reading device 5 may display the instructing screen 53, the instructing screen 54 and the inquiring screen 55.

Further, although, in the above-described embodiment, an example that the re-reading operation for the double feed document and the restarting operation for the following document are started according to operation of the start key of the operation display part 8 is described, the present disclosure is not limited by this example. For example, in a different embodiment of the disclosure, the re-reading controlling part 52 may display the other start key for operating start of the re-reading operation for the double feed document and the restarting operation for the following document on the instructing screen 53, the instructing screen 54 and the inquiring screen 55. Moreover, although, in the above-described embodiment, an example that the document reading device 5 receives operation from the user via the operation display part 8 of the multifunction peripheral 1 is described, the present disclosure is not limited by this example. For example, in a different embodiment of the disclosure, an operation device provided in the document reading device 5 may receive operation from the user.

Although the above-described embodiments have described about a case applying the configuration of the present disclosure to the document reading device 5 or the multifunction peripheral 1 including this document reading device 5, in a further different embodiment, the configuration of the present disclosure may be applied to another image forming apparatus (e.g. a printer, a copying machine, a facsimile or the like) including the document reading device 5.

The above-description of the embodiment of the present disclosure was described about a preferable embodiment of the document reading device and the image forming apparatus according to the disclosure. However, the technical scope of the present disclosure is not limited to the embodiments.

The invention claimed is:

1. A document reading device comprising:
an image reading part reading a document to obtain image data of the document;
a document conveying part conveying the document to the image reading part;
an operation display part including a display device and receiving operation input from a user;
a double feed detecting part detecting double feed of the document conveyed to the image reading part; and
a controlling part, while performing conveyance reading including document conveying by the document conveying part and image reading by the image reading part with regard to a plurality of documents, when the double feed detecting part detects double feed of the document, stopping the conveyance reading for a following document following to a double feed document to which double feed is detected, performing a re-reading operation for the double feed document to make the display device display an instruction for urging to place only one double feed document onto the document conveying part and to set a double feed detection function of the double feed detecting part to OFF and after re-performing the conveyance reading of the double feed document, performing a restarting operation for the following document to set the double feed detection function to ON and to restart the conveyance reading of the following document.

2. The document reading device according to claim 1, wherein
the controlling part, while performing the conveyance reading of the plurality of documents, in a case where the double feed detecting part detects double feed of the documents continuously or a case where the double feed detecting part detects double feed of the documents by predetermined times, receives, via the operation display part, user selection whether or not the double feed detection function is kept always OFF in the restarting operation thereafter, and, if receiving the user selection that the double feed detection function is kept always OFF, sets the double feed detection function to always OFF in the restarting operation thereafter.

3. The document reading device according to claim 1, wherein
the double feed detecting part includes a plurality of double feed sensors detecting double feed of the document, the plurality of double feed sensors being arranged at intervals in a width direction orthogonal to a conveying direction of the document,
the controlling part, in a case where one double feed sensor of the plurality of double feed sensors detects double feed of the document, in the re-reading operation, sets the double feed detection function of one double feed sensor that detects double feed of the documents to OFF and sets the double feed detection function of the other double feed sensors of the plurality of double feed sensors to ON.

4. The document reading device according to claim 1, wherein
the controlling part, in the re-reading operation for the double feed document, when making the display device display the instruction for urging to place only one double feed document onto the document conveying part, makes the display device display an instruction to remove the following document from the document conveying part, and, in the restarting operation for the following document, makes the display device display an instruction to replace the following document on the document conveying part.

5. The document reading device according to claim 4, wherein
the controlling part, when making the display device display the instruction to replace the following document on the document conveying part, makes the display device display the number of pages of the following document.

6. The document reading device according to claim 1 further comprising:
a storing part,
the controlling part, when the double feed detecting part detects double feed of the document, stores the image data obtained from the double feed document by the image reading part, in the storing part, and, when the re-reading operation for the double feed document is completed, stores the image data when the re-reading operation is performed, which is obtained from the double feed document by the image reading part, in the storing part and delete the image data when double feed is detected.

7. An image forming apparatus comprising:
an image forming part forming an image; and
the document reading device according to claim 1.

* * * * *